United States Patent
Guen (10) Patent No.: US 10,249,868 B2
(45) Date of Patent: Apr. 2, 2019

(54) SECONDARY BATTERY INCLUDING CAP PLATE INCLUDING INVERSION PLATE

(71) Applicant: Samsung SDI Co., Ltd., Yongin-si, Gyeonggi-do (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 365 days.

(21) Appl. No.: 14/977,482

(22) Filed: Dec. 21, 2015

(65) Prior Publication Data
US 2017/0018757 A1    Jan. 19, 2017

(30) Foreign Application Priority Data
Jul. 15, 2015    (KR) ................ 10-2015-0100345

(51) Int. Cl.
*H01M 2/34*    (2006.01)
*H01M 2/12*    (2006.01)
*H01M 2/04*    (2006.01)

(52) U.S. Cl.
CPC ........... *H01M 2/345* (2013.01); *H01M 2/043* (2013.01); *H01M 2/12* (2013.01); *H01M 2200/20* (2013.01)

(58) Field of Classification Search
CPC ........ H01M 2/345; H01M 2/043; H01M 2/12; H01M 2200/20
USPC ........................................................ 429/179
See application file for complete search history.

(56) References Cited

U.S. PATENT DOCUMENTS

| | | | |
|---|---|---|---|
| 2006/0093907 A1 | 5/2006 | Jeon et al. | |
| 2006/0117701 A1 | 6/2006 | Kajimura | |
| 2009/0253027 A1 | 10/2009 | Yang et al. | |
| 2011/0183198 A1 | 7/2011 | Byun et al. | |
| 2011/0300435 A1 | 12/2011 | Byun | |
| 2012/0183818 A1* | 7/2012 | Byun ................ | H01M 2/0473 429/61 |
| 2012/0258339 A1* | 10/2012 | Kim ................... | H01M 2/065 429/61 |

(Continued)

FOREIGN PATENT DOCUMENTS

| | | |
|---|---|---|
| KR | 2007/0110567 A | 11/2007 |
| KR | 2011/0087566 A | 8/2011 |

(Continued)

OTHER PUBLICATIONS

U.S. Office Action dated Jul. 31, 2015, issued in U.S. Appl. No. 14/037,333 (10 pages).

(Continued)

*Primary Examiner* — Gary D Harris
(74) *Attorney, Agent, or Firm* — Lewis Roca Rothgerber Christie LLP (57) ABSTRACT

A secondary battery includes: an electrode assembly, a case accommodating the electrode assembly, a cap plate sealing the case and including an inversion plate, an insulation plate including a short-circuit hole corresponding to the inversion plate and a first air hole spaced apart from the short-circuit hole and formed along a top surface of the cap plate, the insulation plate being coupled to the top surface of the cap plate, and a terminal plate coupled to a top surface of the insulation plate and electrically coupled to the electrode assembly. The first air hole is a hole coupling from a top portion of the inversion plate to the outside of the insulation plate.

10 Claims, 5 Drawing Sheets

(56) References Cited

U.S. PATENT DOCUMENTS

2014/0315056 A1* 10/2014 Guen .................... H01M 2/345
                                                              429/61
2015/0037628 A1    2/2015 Guen

FOREIGN PATENT DOCUMENTS

| KR | 2012/0089983 A    | 8/2012  |
| KR | 10-2012-0115439 A | 10/2012 |
| KR | 10-2014-0126115 A | 10/2014 |
| KR | 10-2015-0016778 A | 2/2015  |

OTHER PUBLICATIONS

U.S. Notice of Allowance dated Nov. 19, 2015, issued in U.S. Appl. No. 14/037,333 (9 pages).

* cited by examiner

FIG. 7

SECONDARY BATTERY INCLUDING CAP PLATE INCLUDING INVERSION PLATE

CROSS-REFERENCE TO RELATED APPLICATION

This application claims priority to and the benefit of Korean Patent Application No. 10-2015-0100345 filed on Jul. 15, 2015 in the Korean Intellectual Property Office, the entire contents of which are incorporated herein by reference.

BACKGROUND

1. Field

Embodiments of the present disclosure relate to a secondary battery.

2. Description of the Related Art

Unlike primary batteries which are not designed to be rechargeable, secondary batteries are designed to be charged and discharged. Low-capacity secondary batteries each using a single battery cell packaged in a battery pack are employed in small-sized portable electronic devices such as cellular phones or camcorders, while large-capacity secondary batteries each using tens of battery cells coupled or connected to each other in a battery pack are used for driving motors of hybrid automobiles or the like.

Secondary batteries may be manufactured in various suitable shapes, including cylindrical and prismatic shapes. The secondary battery is generally configured by accommodating an electrode assembly having a positive plate and a negative plate and a separator as an insulator located therebetween in a case with an electrolyte and installing a cap plate having electrode terminals in the case. Positive and negative electrode terminals are coupled or connected to the electrode assembly and are exposed or protruded to the outside through the cap plate.

In an event where damage due to an external short-circuit, over-charge or nail penetration is caused to a secondary battery, ignition or explosion of the secondary battery may occur. Accordingly, there is a demand for a secondary battery configured to improve its safety.

SUMMARY

Embodiments of the present disclosure provide a secondary battery, which releases the air existing between an inversion plate and a terminal plate at two holes of opposite sides of the inversion plate (e.g., at sides of the inversion plate that face each other), thereby easily releasing the air and preventing the inversion plate from being bent or distorted when the inversion plate is inverted (or reducing such bending or distortion of the inversion plate).

Embodiments of the present disclosure also provide a secondary battery, which includes air holes formed by removing a passageway handle provided to prevent vapor or moisture from being induced during assembling and cleansing processes of the secondary battery (or to reduce such induction of the vapor or moisture), thereby preventing the vapor or moisture from being induced during a manufacturing process (or reducing such induction of the vapor or moisture) and easily releasing the air existing between an inversion plate and a terminal plate when the inversion plate is inverted.

The above and other aspects of embodiments of the present disclosure will be described in or be apparent from the following description of exemplary embodiments.

According to an aspect of an embodiment of the present disclosure, there is provided a secondary battery secondary battery including: an electrode assembly, a case accommodating the electrode assembly, a cap plate sealing the case and including an inversion plate, an insulation plate including a short-circuit hole corresponding to the inversion plate and a first air hole spaced apart from the short-circuit hole and located along a top surface of the cap plate, the insulation plate being coupled to the top surface of the cap plate, and a terminal plate coupled to a top surface of the insulation plate and electrically coupled or connected to the electrode assembly, wherein the first air hole is a hole coupling or connecting from a top portion of the inversion plate to the outside of the insulation plate.

The first air hole may be formed by removing a passageway handle interposed between the cap plate and the insulation plate and extending to the top portion of the inversion plate in the course of manufacturing the secondary battery.

The cap plate includes at least one coupling groove on a top surface of the cap plate, and the insulation plate includes at least one coupling protrusion at a region of a bottom surface of the cap plate, corresponding to the at least one coupling groove.

The insulation plate further includes a second air hole spaced apart from the short-circuit hole, at a side opposite to the first air hole in view of the short-circuit hole and passing through the top surface and the bottom surface of the insulation plate.

The second air hole is engaged with the at least one coupling protrusion.

The inversion plate includes a downwardly convex round part and a periphery part fixed to the insulation plate.

The first air hole and the second air hole release the air existing in a space between the terminal plate and the inversion plate when the round part of the inversion plate is inverted due to an increase in the internal pressure of the case.

The secondary battery may further include a ring-shaped sealing member interposed between the bottom surface of the insulation plate and the top surface of the cap plate and spaced apart from the short-circuit hole to surround the short-circuit hole.

The secondary battery may further include a fastening shaft passing through the cap plate to be electrically coupled or connected to a current collector coupled or connected to the electrode assembly under the cap plate and to be electrically coupled or connected to the terminal plate on the cap plate.

According to an aspect of an embodiment of the present disclosure, there is provided a secondary battery including: an electrode assembly, a case accommodating the electrode assembly, a cap plate sealing the case, the cap plate including an inversion plate and having at least one coupling groove provided on a top surface of the cap plate, an insulation plate including a short-circuit hole corresponding to the inversion plate, at least one coupling protrusion spaced apart from the short-circuit hole and engaged with the at least one coupling groove, the insulation plate being coupled to the top surface of the cap plate, and a terminal plate coupled to the top surface of the insulation plate and electrically coupled or connected to the electrode assembly, wherein the insulation plate is on the at least one coupling protrusion and an air hole passes through the top surface and the bottom surface of the insulation plate.

As described above, in the secondary battery according to an embodiment of the present disclosure, since the air existing between an inversion plate and a terminal plate is released at two holes of opposite sides of the inversion plate (e.g., at sides of the inversion plate that face each other), the air can be easily released and the inversion plate can be prevented from being bent or distorted when the inversion plate is inverted (or such bending or distortion of the inversion plate can be reduced).

In some embodiments, in the secondary battery according to an embodiment of the present disclosure, since air holes are formed by removing a passageway handle provided to prevent vapor or moisture from being induced during assembling and cleansing processes of the secondary battery (or to reduce such induction of the vapor or moisture), moisture can be prevented from being induced during a manufacturing process (or such induction of the vapor or moisture can be reduced) and the air existing between an inversion plate and a terminal plate can be easily released when the inversion plate is inverted.

BRIEF DESCRIPTION OF THE DRAWINGS

The above and other features of embodiments of the present disclosure will become more apparent from the following description of exemplary embodiments thereof with reference to the attached drawings in which.

DETAILED DESCRIPTION

Hereinafter, embodiments of the present disclosure will be described with reference to the accompanying drawings. The subject matter of the present disclosure may, however, be embodied in many different forms and should not be construed as being limited to the embodiments set forth herein. Rather, these embodiments are provided so that this disclosure will be thorough and complete and will fully convey the concepts of the disclosure to those skilled in the art.

In the drawings, the thickness of layers and regions may be exaggerated for clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosed subject matter. As used herein, the singular forms are intended to include the plural forms as well, unless the context clearly indicates otherwise. It will be further understood that the terms "comprise" and/or "comprising," when used in this specification, specify the presence of stated features, integers, acts, operations, elements, and/or components, but do not preclude the presence or addition of one or more other features, integers, acts, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Figure 1:
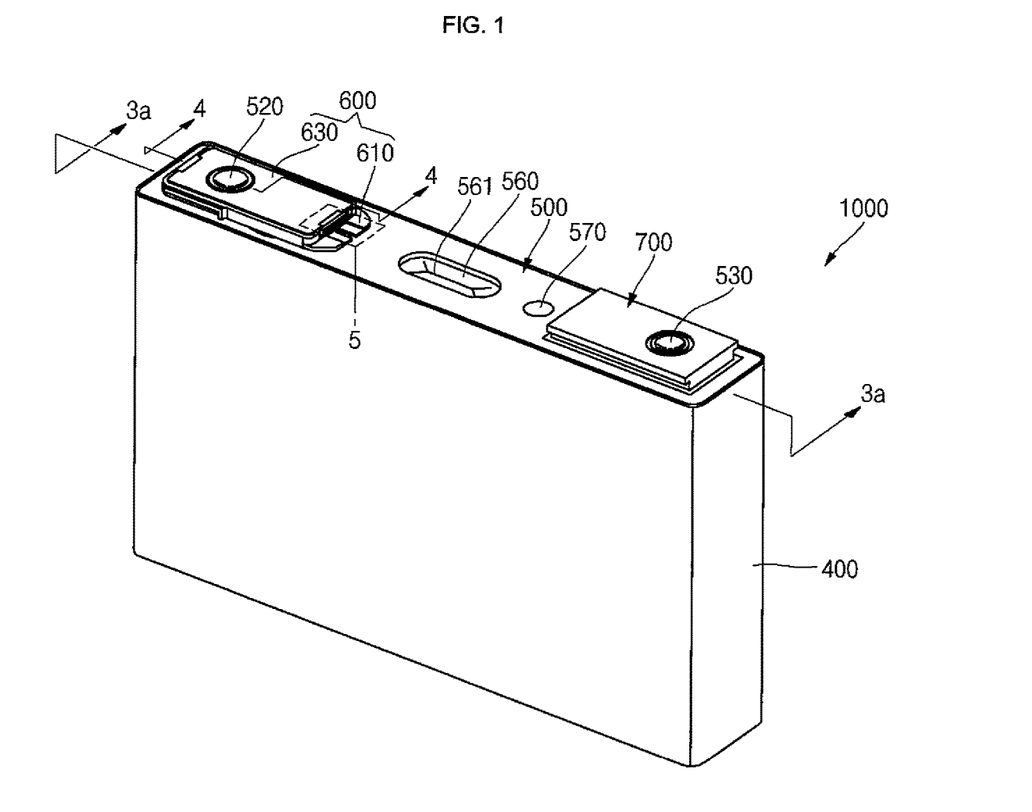
FIG. 1 is a perspective view of a secondary battery according to an embodiment of the present disclosure.
Figure 2:
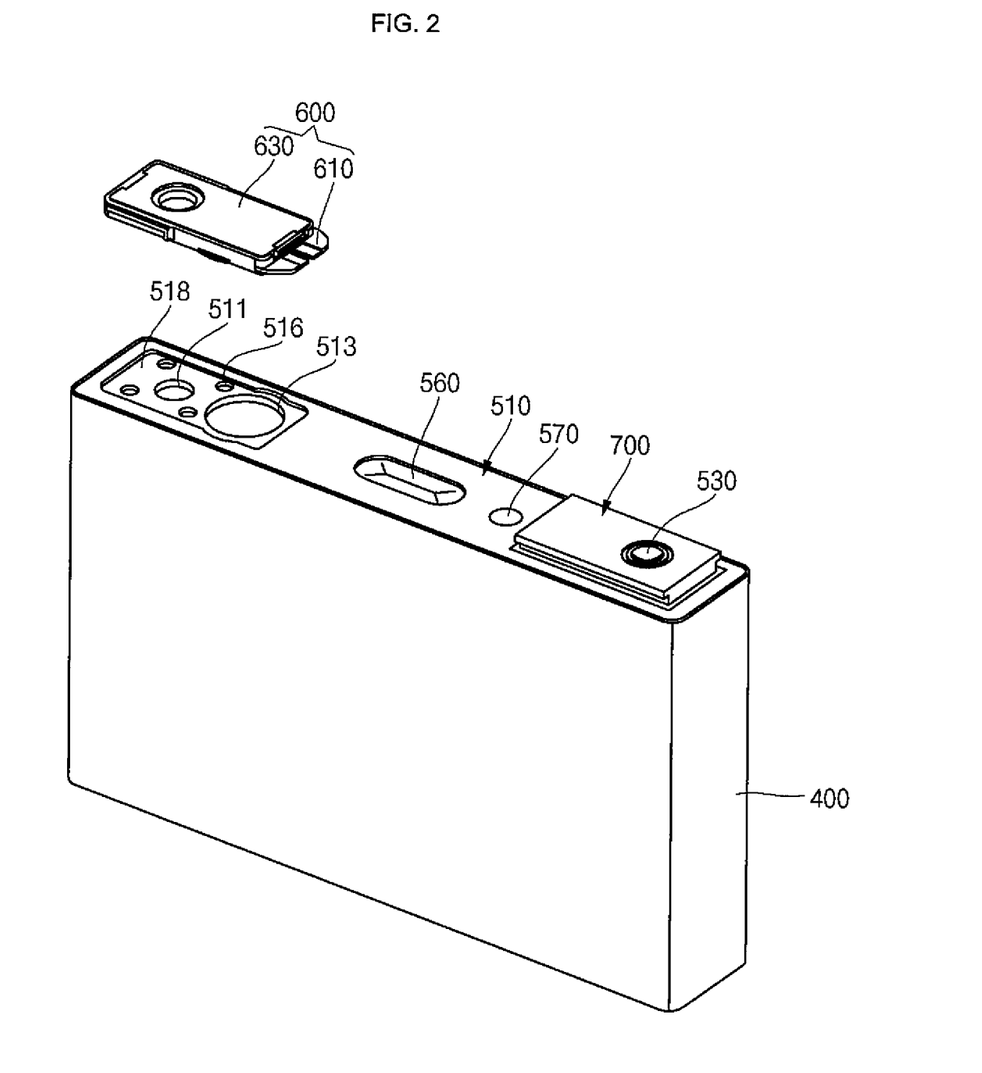
FIG. 2 is a partially exploded perspective view illustrating a case and a first terminal assembly of the secondary battery shown in FIG. 1.
Figure 3A:
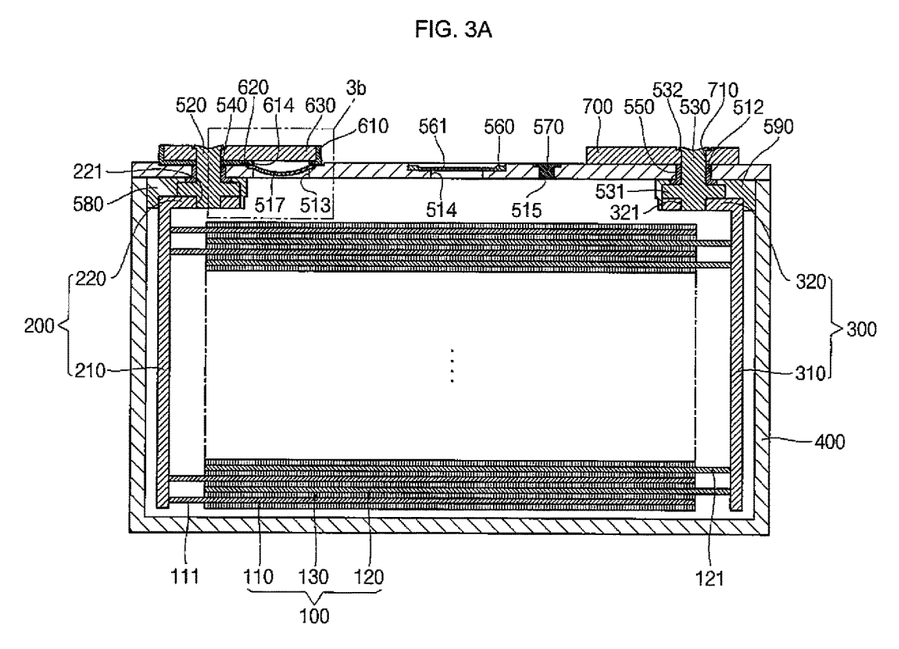
FIG. 3A is a cross-sectional view of the secondary battery taken along the line 3a-3a of FIG. 1
Figure 3B:
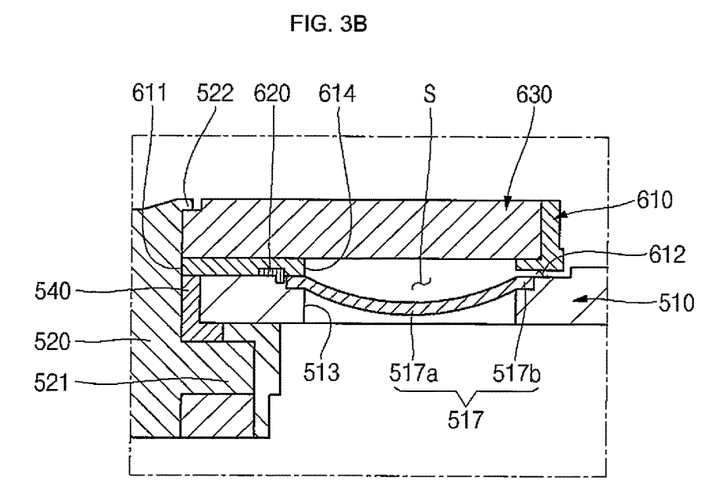
FIG. 3B is an enlarged cross-sectional view illustrating a portion 3b of FIG. 3A.
Figure 4:
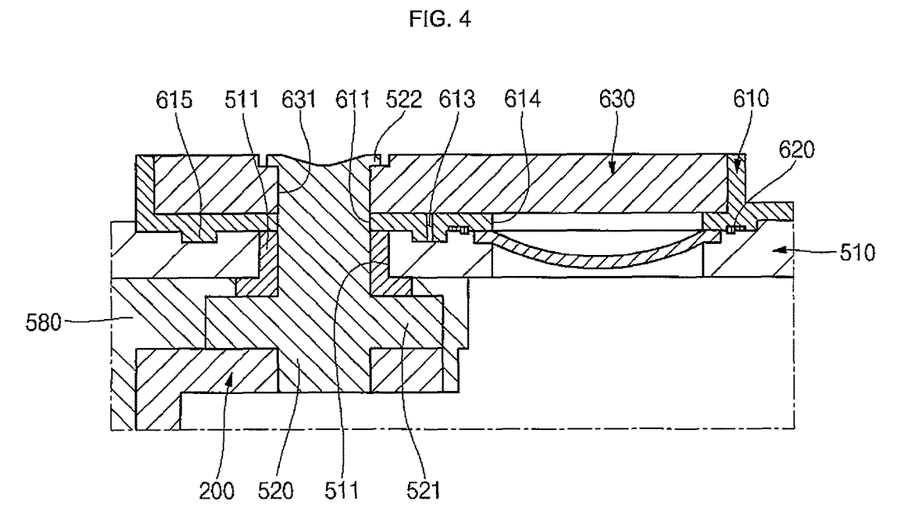
FIG. 4 is a partial cross-sectional view of the secondary battery taken along the line 4-4 of FIG. 1.
Figure 5:
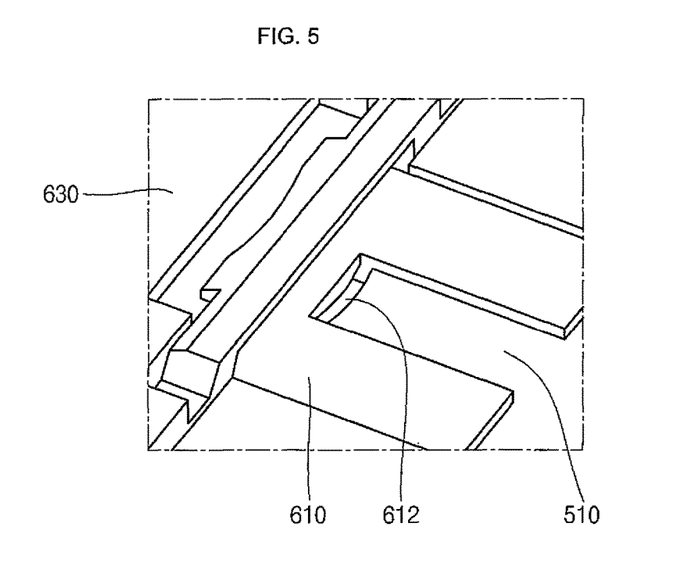
FIG. 5 is an enlarged perspective view illustrating a portion 5 of FIG. 1.

FIG. 1 is a perspective view of a secondary battery according to an embodiment of the present disclosure, FIG. 2 is a partially exploded perspective view illustrating a case and a first terminal assembly of the secondary battery shown in FIG. 1, FIG. 3A is a cross-sectional view of the secondary battery taken along the line 3a-3a of FIG. 1 and FIG. 3B is an enlarged cross-sectional view illustrating a portion 3b of FIG. 3A, FIG. 4 is a partial cross-sectional view of the secondary battery taken along the line 4-4 of FIG. 1, and FIG. 5 is an enlarged perspective view illustrating a portion 5 of FIG. 1.

Referring to FIGS. 1 to 5, the secondary battery 1000 according to an embodiment of the present disclosure includes an electrode assembly 100, a first current collector 200, a second current collector 300, a case 400, a cap assembly 500, a first terminal assembly 600 and a second terminal assembly 700.

The electrode assembly 100 is formed by winding or laminating a stacked structure including a first electrode plate 110, a separator 130 and a second electrode plate 120, each of which may be formed to be a thin plate or layer. Here, the first electrode plate 110 may function as a negative electrode and the second electrode plate 120 may function as a positive electrode, or vice versa.

The first electrode plate 110 may be formed by applying a first electrode active material, such as graphite or carbon, on a first electrode collector including (e.g., formed of) a metal foil, such as a nickel or copper foil. The first electrode plate 110 may include a first electrode uncoated portion 111 on which the first electrode active metal is not applied (e.g., a portion that is free or substantially free of the first electrode active metal). The first electrode uncoated portion 111 may function as a passage for current flowing between the first electrode plate 110 and the outside of the first electrode plate 110. However, the present disclosure does not limit the material of the first electrode plate 110 to those listed herein.

The second electrode plate 120 may be formed by applying a second electrode active material, such as a transition metal, on a second electrode collector including (e.g., formed of) a material such as an aluminum foil. The second electrode plate 120 may include a second electrode uncoated portion 121 on which the second electrode active metal is not applied (e.g., a portion that is free or substantially free of the second electrode active metal). The second electrode uncoated portion 121 may function as a passage for current flowing between the second electrode plate 120 and the outside of the second electrode plate 120. However, the present disclosure does not limit the material of the second electrode plate 120 to those listed herein. In some embodiments, the first and second electrode plates 110 and 120 may have different polarities (e.g., the first and second electrode plates 110 and 120 may have respective polarities that are different from each other).

The separator 130 may be located between the first electrode plate 110 and the second electrode plate 120 to prevent or reduce short circuiting and allow the movement of lithium ions. The separator 130 may include (e.g., be formed of), for example, polyethylene, polypropylene, or a combined film of polypropylene and polyethylene. However, the present disclosure does not limit the material of the separator 130 to those listed herein.

The electrode assembly 100 and an electrolyte may be accommodated in the case 400 through a top opening of the case 400 and the top opening of the case 400 may be sealed by the cap plate 510 of the cap assembly 500. Contact portions of the cap plate 510 and the case 400 may be coupled to each other by, for example, welding (e.g., laser welding).

The first electrode plate 110 and the second electrode plate 120 of the electrode assembly 100 may be electrically coupled or connected to the first current collector 200 and the second current collector 300, respectively.

The first current collector 200 may include (e.g., be formed of) a conductive material, such as nickel, and is brought into contact with or coupled to the first electrode uncoated portion 111 protruding to one end of the electrode assembly 100 to then be electrically coupled or connected to the first electrode plate 110. The first current collector 200 includes a first connecting part 210 and a first extending part 220.

The first connecting part 210 contacts the first electrode uncoated portion 111 and is shaped of a plate (e.g., has a plate shape). For example, in some embodiments, the first connecting part 210 is electrically coupled or connected to the electrode assembly 100 through the first electrode uncoated portion 111.

The first extending part 220 is bent and extends from a top end of the first connecting part 210 and includes a first fastening hole 221 passing through a top surface and a bottom surface of the first extending part 220. The first fastening hole 221 is at (e.g., formed at) one side of the first extending part 220 and a first fastening shaft 520 of the cap assembly 500 is inserted into and coupled to the first extending part 220. The first fastening hole 221 may be shaped and sized to correspond to the first fastening shaft 520 so as to accommodate the first fastening shaft 520. In a state in which the first fastening shaft 520 is inserted into the first fastening hole 221, the first fastening shaft 520 and the first fastening hole 221 may be coupled to each other by, for example, welding (e.g., laser welding).

The second current collector 300 may include (e.g., be formed of) a conductive material, such as aluminum, and is brought into contact with or coupled to the second electrode uncoated portion 121 protruding to the other end of the electrode assembly 100 to then be electrically coupled or connected to the second electrode plate 120. The second current collector 300 includes a second connecting part 310 and a second extending part 320. The second extending part 320 includes a second fastening hole 321 passing through a top surface and a bottom surface of the second extending part 320.

Here, since the second connecting part 310, the second extending part 320 and the second fastening hole 321 of the second current collector 300 have the same or substantially the same shapes and functions as those of the first connecting part 210, the first extension part 220 and the first fastening hole 221 of the first current collector 200, respectively, repeated descriptions thereof are not necessary.

The case 400 may include (e.g., be formed of) a conductive metal, such as aluminum, an aluminum alloy or a nickel plated steel and may have an approximately hexahedron shape provided with an opening through which the electrode assembly 100, the first current collector 200 and the second current collector 300 are inserted and placed. Since the case 400 and the cap assembly 500 are illustrated in an assembled state in FIG. 1, the opening of the case 400 is sealed by the cap plate 510 of the cap assembly 500. However, it will be appreciated that the opening corresponds to a substantially opened portion of the edge of the cap assembly 500. Meanwhile, the inner surface of the case 400 may be treated to be insulated from the electrode assembly 100, the electrode assembly 100, the first current collector 200, the second current collector 300 and the cap assembly 500.

The cap assembly 500 is coupled to the case 400. For example, the cap assembly 500 may include the cap plate 510, the first fastening shaft 520, a second fastening shaft 530, a first gasket 540 and a second gasket 550. In some embodiments, the cap assembly 500 may further include a vent plate 560, a plug 570, a first insulation member 580 and a second insulation member 590.

The cap plate 510 closes the opening of the case 400 and may include (e.g., be formed of) the same or substantially the same material as the case 400. The cap plate 510 may include a first fastening hole 511, a second fastening hole 512, a first short-circuit hole 513, a vent hole 514, an electrolyte injection hole 515, a coupling groove 516, an inversion plate 517 and an insertion groove 518. Here, the cap plate 510 and the case 400 may have the same polarity (e.g., the respective polarity of the cap plate 510 and the case 400 may be the same as each other). The first fastening hole 511, the second fastening hole 512, the first short-circuit hole 513, the vent hole 514 and the electrolyte injection hole 515 may be holes passing through the top surface and the bottom surface of the cap plate 510.

The cap plate 510 is shaped of a rectangular plate (e.g., has a rectangular plate shape), which has two short side surfaces facing each other and two long side surfaces coupling or connecting the short side surfaces.

The coupling groove 516 is on (e.g., formed on) the top surface of the cap plate 510 and is engaged with a coupling protrusion 615 of the first terminal assembly 600, which is described in more detail below.

The inversion plate 517 is in (e.g., formed in) the first short-circuit hole 513 of the cap plate 510. Referring to FIGS. 3A and 3B, the inversion plate 517 in (e.g., formed in) the first short-circuit hole 513 of the cap plate 510 is illustrated. However, the inversion plate 517 may also or alternatively be in (e.g., formed in) the second short-circuit hole 614 of the insulation plate 610.

The inversion plate 517 may include a downwardly convex round part 517a and an edge part 517b fixed to the second short-circuit hole 614 of the insulation plate 610. Here, the inversion plate 517 and the cap plate 510 are electrically coupled or connected to each other and have the same polarity (e.g., the respective polarity of the inversion plate 517 and the cap plate 510 may be the same as each other).

When the internal pressure of the secondary battery 1000 exceeds a set or preset pressure due to over-charge of the secondary battery 1000, the round part 517a of the inversion plate 517 is inverted to protrude upwardly convexly to make contact (e.g., physical contact) with the first terminal plate 630, thereby resulting in short circuiting.

Here, air having a set or predetermined volume may exist in a space S between the round part 517a and the first terminal plate 630. When the round part 517a is rapidly inverted to be upwardly convex, the air may be released to a region between the cap plate 510 and the insulation plate 610 through a first air hole 612 and a second air hole 613, which is described in more detail below. Accordingly, it is possible to prevent the insulation plate 610 and the first terminal plate 630 from growing apart from each other due to the air existing in the space S (or such growth can be reduced).

The insertion groove 518 is on (e.g., formed on) the top surface of the cap plate 510 and a bottom portion of the insulation plate 610 of the first terminal assembly 600 is inserted (e.g., partially inserted) into the insertion groove 518. The insertion groove 518 may be shaped and sized to correspond to the bottom portion of the insulation plate 610. In some embodiments, the first fastening hole 511, the first short-circuit hole 513 and the coupling groove 516 may be on (e.g., formed on) a top surface of the insertion groove 518.

In some embodiments, the first fastening shaft 520 passes through the first fastening hole 511 of the cap plate 510 and is electrically coupled or connected to the first current collector 200. The first fastening shaft 520 may be shaped of a pillar (e.g., has a pillar shape). A riveting part 522, which is described in more detail below, is on (e.g., formed on) the outer circumferential edge of an upper pillar exposed to the top portion of the cap plate 510, and a flange 521 is at (e.g., formed at) a lower pillar positioned at a lower portion of cap plate 510 to prevent the first fastening shaft 520 from being dislodged from the cap plate 510 (or to reduce such dislodging of the first fastening shaft 520 from the cap plate 510). At least a portion of the lower pillar of the first fastening shaft 520, positioned under the flange 521, is inserted into the first fastening hole 221 of the first current collector 200.

In some embodiments, the second fastening shaft 530 passes through the second fastening hole 512 of the cap plate 510 and is electrically coupled or connected to the second current collector 300. Like the first fastening shaft 520, the second fastening shaft 530 includes a flange 531 and a riveting part 532, and repeated descriptions thereof are not necessary. In some embodiments, the second fastening shaft 530 may be electrically coupled or connected to the cap plate 510.

The first and second gaskets 540 and 550 are between (e.g., formed between) each of the first fastening shaft 520 and the second fastening shaft 530 and the cap plate 510, respectively, using insulating materials, to seal spaces between each of the first fastening shaft 520 and the second fastening shaft 530 and the cap plate 510. The first and second gaskets 540 and 550 may prevent external moisture from penetrating into the secondary battery 1000 (or may reduce such penetration of external moisture) or may prevent the electrolyte contained in the secondary battery 1000 from flowing out (or may reduce such outflow).

The vent plate 560 is installed in the vent hole 514 of the cap plate 510 and includes a notch 561 configured to be opened at a set or preset pressure. The plug 570 seals the electrolyte injection hole 515 of the cap plate 510.

The first and second insulation members 580 and 590 are between (e.g., formed between) each of the first current collector 200 and the second current collector 300 and the cap plate 510, thereby preventing or reducing unnecessary or undesirable short circuiting.

The first terminal assembly 600 includes an insulation plate 610, a sealing member 620 and a first terminal plate 630.

Figure 6:
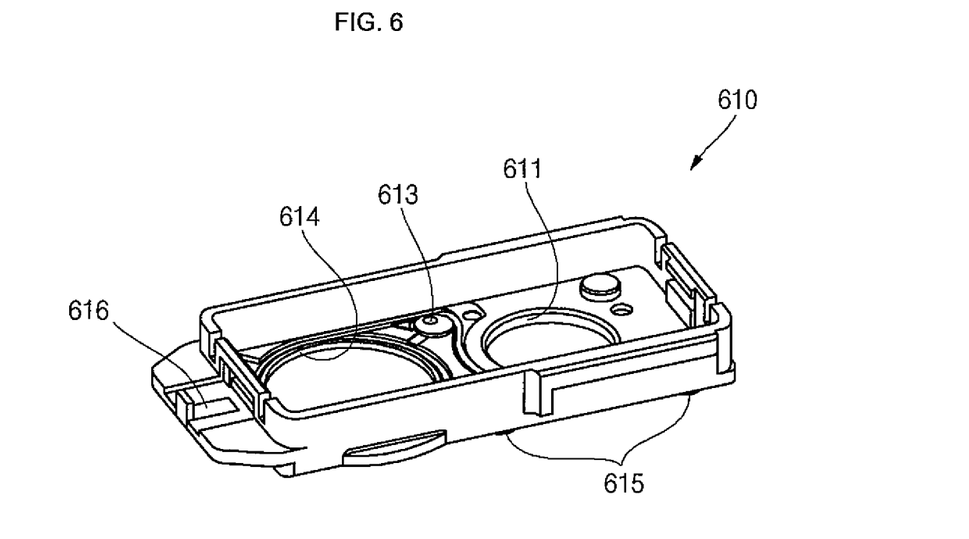
FIG. 6 is an enlarged perspective view illustrating an insulation plate and a sealing member before a passageway handle is removed from the secondary battery shown in FIG. 1.
Figure 7:
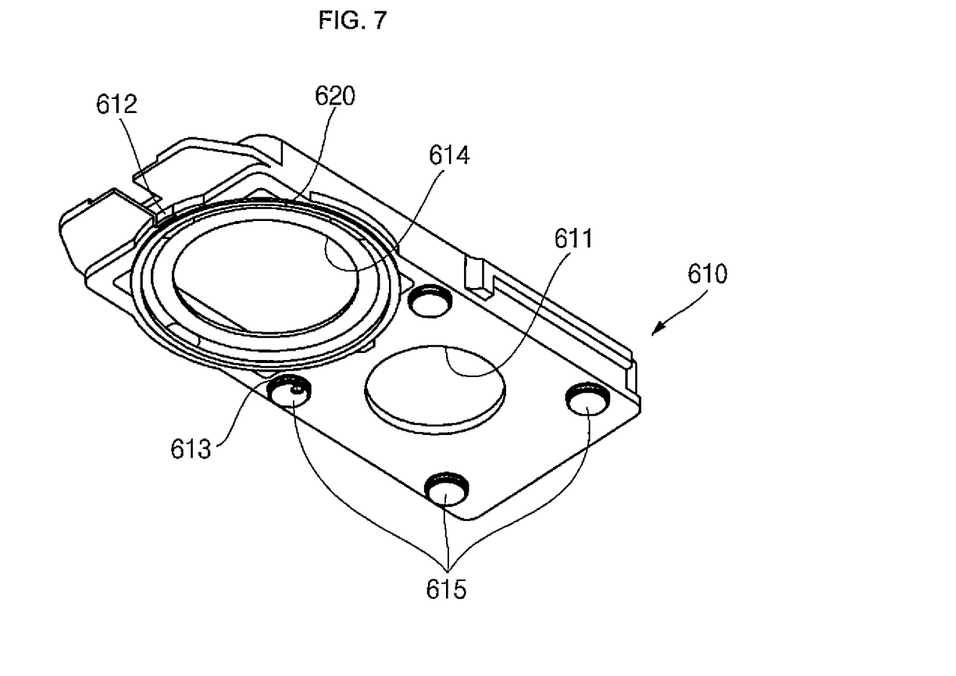
FIG. 7 is an enlarged bottom perspective view illustrating an insulation plate and a sealing member of the secondary battery shown in FIG. 1.

FIG. 6 is an enlarged perspective view illustrating an insulation plate and a sealing member before a passageway handle is removed from the secondary battery shown in FIG. 1, and FIG. 7 is an enlarged bottom perspective view illustrating an insulation plate and a sealing member of the secondary battery shown in FIG. 1. In the following description, the insulation plate 610 and the sealing member 620 will be described with reference to FIGS. 6 and 7.

The insulation plate 610 includes a first fastening hole 611, a first air hole 612, a second air hole 613, a second short-circuit hole 614 and a first coupling protrusion 615. The insulation plate 610 is inserted into the insertion groove 518 on (e.g., formed on) the top surface of the cap plate 510 to be coupled to the insertion groove 518.

The first fastening hole 611 is a hole through which the first fastening shaft 520 passes and may be contiguous to one short side surface of the cap plate 510 in the insulation plate 610 (e.g., the first fastening hole 611 of the insulation plate 610 may be located and sized to correspond to the first fastening hole 511 of the cap plate 510). The second short-circuit hole 614 is spaced apart (e.g., formed to be spaced apart) from the first fastening hole 611 toward the second terminal assembly 700 and may be located and sized to correspond to the first short-circuit hole 513.

The first air hole 612 is spaced a set or predetermined distance apart from the second short-circuit hole 614. When the round part 517a is rapidly inverted to be upwardly convex, the air existing in the space S between the round part 517a and the first terminal plate 630 may be released through the region between the cap plate 510 and the insulation plate 610 through the first air hole 612 between the cap plate 510 and the insulation plate 610. The air in the space S may prevent the insulation plate 610 and the first terminal plate 630 from growing apart from each other (or may reduce such movement). The first air hole 612 may be a hole formed by removing a passageway handle 616. The passageway handle 616 is provided to prevent vapor or moisture from penetrating into the secondary battery 1000 during assembling and cleaning processes (or to reduce such penetration of the vapor or moisture). In some embodiments, the passageway handle 616 is removed after completion of the manufacturing process and before shipment. For example, in some embodiments, if the passageway handle 616 is removed, the insulation plate 610 includes the first air hole 612 shaped to correspond to the passageway handle 616.

The first air hole 612 is a hole coupled or connected from the space S between the round part 517a and the first terminal plate 630 to the outside of the secondary battery 1000 along the region between the insulation plate 610 and the cap plate 510. The first air hole 612 is provided at the other side of the insulation plate 610 adjacent to the second terminal assembly 700.

The second air hole 613 is spaced a set or predetermined distance apart from the second short-circuit hole 614. When the round part 517a is rapidly inverted to be upwardly convex, the second air hole 613 allows the air existing in the space S between the round part 517a and the first terminal plate 630 to be released to a region between cap plate 510 and the insulation plate 610. The second air hole 613 may be formed around (e.g., may be near to) the second short-circuit hole 614 to be adjacent to the first fastening hole 611 opposite to the first air hole 612 (e.g., the second air hole 613 may be at a side of the inversion plate that faces the side at which the first air hole 612 is located). As described above, the first air hole 612 and the second air hole 613 of the insulation plate 610 are provided at opposite sides of the short-circuit hole 614, thereby easily releasing the air existing in the space S between the round part 517a and the first terminal plate 630 even when the round part 517a of the inversion plate 517 is rapidly upwardly convexly inverted. In some embodiments, when the round part 517a of the inversion plate 517 is rapidly upwardly convexly inverted, the air is released at opposite sides of the inversion plate 517, thereby preventing the inversion plate 517 from being bent or distorted when the inversion plate 517 is inverted (or reducing such bending or distortion of the inversion plate). The second air hole 613 may be provided in the first coupling protrusion 615. For example, in some embodiments, the second air hole 613 is in (e.g., formed in) the insulation plate 610 to pass through a region between top and bottom surfaces of a portion having the first coupling protrusion 615. The second air hole 613 is provided in the first coupling protrusion 615, which may increase a passageway (e.g., increase the length of the passageway), thereby preventing vapor or moisture from being induced (or reducing such induction of the vapor or moisture).

The first coupling protrusion 615 is inserted into the coupling groove 516 on (e.g., formed on) the top surface of the cap plate 510, thereby tightly coupling the first terminal assembly 600 to the cap assembly 500. In the illustrated embodiment, the first coupling protrusion 615 may include four first coupling protrusions symmetrically (e.g., substantially symmetrically) located around (e.g., formed about) the first fastening hole 611, but aspects of embodiments of the present disclosure are not limited thereto. In some embodiments, the second air hole 613 may be in (e.g., formed in) the first coupling protrusion 615 among the first coupling protrusions provided between the second short-circuit hole 614 and the first fastening hole 611.

The sealing member 620 may be interposed between the cap plate 510 and the insulation plate 610. The sealing member 620 is outwardly spaced apart (e.g., formed to be outwardly spaced apart) from the edge of the second short-circuit hole 614 of the insulation plate 610. In some embodiments, the sealing member 620 may be outwardly spaced apart (e.g., formed to be outwardly spaced apart) from a periphery part 517b of the inversion plate 517 and may be shaped of a ring (e.g., the sealing member may have a ring shape). For example, in some embodiments, the sealing member 620 seals a space between the insulation plate 610 and the cap plate 510, thereby preventing vapor or moisture from gathering on the inversion plate 517 (or reducing such gathering on the inversion plate 517) due to induction of external vapor or moisture to the space between the insulation plate 610 and the cap plate 510.

Accordingly, the sealing member 620 prevents short circuiting from being caused by electrically coupling or connecting the first terminal plate 630 (or reduces such short circuiting) and the inversion plate 517 due to vapor or moisture, thereby suppressing deterioration and a reduction in the capacity of the secondary battery 1000 and preventing internal components of the secondary battery 1000 from corroding due to the presence of vapor or moisture (or reduces such corrosion). The sealing member 620 may increase sealing efficiency and may include (e.g., be formed of) an adhesive or rubber material. In some embodiments, the sealing member 620 includes (e.g., is formed of) a thermoplastic elastomer (TPE) having excellent molding processability and corrosion resistance and high elasticity, but the present disclosure does not limit the material of the sealing member 620 to that disclosed herein.

The first terminal plate 630 is coupled to a top surface of the insulation plate 610 and includes a first fastening hole 631 and a second coupling protrusion 632.

The first fastening hole 631 is a hole allowing (e.g., formed to allow) the first fastening shaft 520 to pass therethrough. A top end of the first fastening shaft 520 is riveted to a top portion of the first fastening hole 631, thereby forming the riveting part 322.

The second terminal assembly 700 may be a second terminal plate, which includes a second fastening hole 710 passing through the second terminal plate 700.

The second terminal plate 700 is coupled to the top surface of the cap plate 510. In some embodiments, the second terminal plate 700 is mechanically coupled to the top surface of the cap plate 500 by, for example, welding. However, the second terminal plate 700 may also be coupled to the cap plate 510 by mechanically coupling a coupling protrusion and a coupling groove between (e.g., formed between) the second terminal plate 700 and the cap plate 510. The second terminal plate 700 and the cap plate 510 may be electrically coupled or connected to each other and may have the same polarity (e.g., the respective polarity of the second terminal plate 700 and the cap plate 510 may be the same as each other).

The second fastening hole 710 is a hole allowing (e.g., formed to allow) the second fastening shaft 530 to pass therethrough. A top end of the second fastening shaft 530 is riveted to a top portion of the second fastening hole 710, thereby forming the riveting part 522.

In the above-described secondary battery 1000, the first air hole 612 and the second air hole 613 are provided at opposite sides of the short-circuit hole 614, thereby easily releasing the air existing in the space S between the round part 517*a* and the first terminal plate 630 even when the round part 517*a* of the inversion plate 517 is rapidly upwardly convexly inverted. In some embodiments, when the inversion plate 517 is rapidly upwardly convexly inverted, the air is released at opposite sides of the inversion plate 517, thereby preventing the inversion plate 517 from being bent or distorted when the inversion plate 517 is inverted (or thereby reducing such bending or distortion).

While the secondary battery of the present disclosure has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A secondary battery comprising:
an electrode assembly;
a case accommodating the electrode assembly;
a cap plate sealing the case and comprising an inversion plate;
an insulation plate comprising a short-circuit hole corresponding to the inversion plate and a first air hole spaced apart from the short-circuit hole and located along a top surface of the cap plate, the insulation plate being coupled to the top surface of the cap plate; and
a terminal plate coupled to a top surface of the insulation plate and electrically coupled to the electrode assembly,
wherein the first air hole is a hole coupling from a top portion of the inversion plate to the outside of the insulation plate, and
wherein the first air hole and the short-circuit hole extend in respective directions that are different from one another.

2. The secondary battery of claim 1, wherein the first air hole is formed by removing a passageway handle interposed between the cap plate and the insulation plate and extending to the top portion of the inversion plate in the course of manufacturing the secondary battery.

3. The secondary battery of claim 1, wherein the cap plate comprises at least one coupling groove on a top surface of the cap plate, and the insulation plate comprises at least one coupling protrusion at a region of a bottom surface of the cap plate, corresponding to the at least one coupling groove.

4. The secondary battery of claim 3, wherein the insulation plate further comprises a second air hole spaced apart from the short-circuit hole, at a side opposite to the first air hole in view of the short-circuit hole and passing through the top surface and the bottom surface of the insulation plate.

5. The secondary battery of claim 4, wherein the second air hole is engaged with the at least one coupling protrusion.

6. The secondary battery of claim 4, wherein the inversion plate comprises a downwardly convex round part and a periphery part fixed to the insulation plate.

7. A secondary battery comprising:
an electrode assembly;
a case accommodating the electrode assembly;
a cap plate sealing the case and comprising an inversion plate;
an insulation plate comprising a short-circuit hole corresponding to the inversion plate and a first air hole spaced apart from the short-circuit hole and located along a top surface of the cap plate, the insulation plate being coupled to the top surface of the cap plate; and
a terminal plate coupled to a top surface of the insulation plate and electrically coupled to the electrode assembly,
wherein the first air hole is a hole coupling from a top portion of the inversion plate to the outside of the insulation plate,
wherein the cap plate comprises at least one coupling groove on a top surface of the cap plate, and the insulation plate comprises at least one coupling protrusion at a region of a bottom surface of the cap plate, corresponding to the at least one coupling groove,
wherein the insulation plate further comprises a second air hole spaced apart from the short-circuit hole, at a side opposite to the first air hole in view of the short-circuit hole and passing through the top surface and the bottom surface of the insulation plate,
wherein the inversion plate comprises a downwardly convex round part and a periphery part fixed to the insulation plate, and
wherein the first air hole and the second air hole release the air existing in a space between the terminal plate and the inversion plate when the round part of the inversion plate is inverted due to an increase in the internal pressure of the case.

8. The secondary battery of claim 1, further comprising a ring-shaped sealing member interposed between the bottom surface of the insulation plate and the top surface of the cap plate and spaced apart from the short-circuit hole to surround the short-circuit hole.

9. The secondary battery of claim 1, further comprising a fastening shaft passing through the cap plate to be electrically coupled to a current collector coupled to the electrode assembly under the cap plate and to be electrically coupled to the terminal plate on the cap plate.

10. A secondary battery comprising:
an electrode assembly;
a case accommodating the electrode assembly;
a cap plate sealing the case, the cap plate comprising an inversion plate and having at least one coupling groove provided on a top surface of the cap plate;
an insulation plate comprising a short-circuit hole corresponding to the inversion plate, and at least one coupling protrusion spaced apart from the short-circuit hole and engaged with the at least one coupling groove, the insulation plate being coupled to the top surface of the cap plate; and
a terminal plate coupled to the top surface of the insulation plate and electrically coupled to the electrode assembly,
wherein the insulation plate is on the at least one coupling protrusion and an air hole passes through the top surface and the bottom surface of the insulation plate, and
wherein the first air hole and the short-circuit hole extend in respective directions that are different from one another.

* * * * *